A. L. PUTNAM.
REINFORCED AND PROTECTED WOODEN VEHICLE WHEEL.
APPLICATION FILED AUG. 21, 1916.
1,245,269.
Patented Nov. 6, 1917.
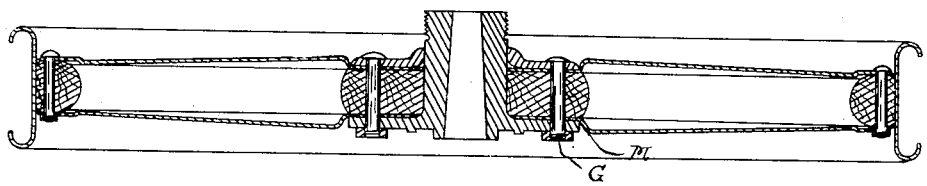
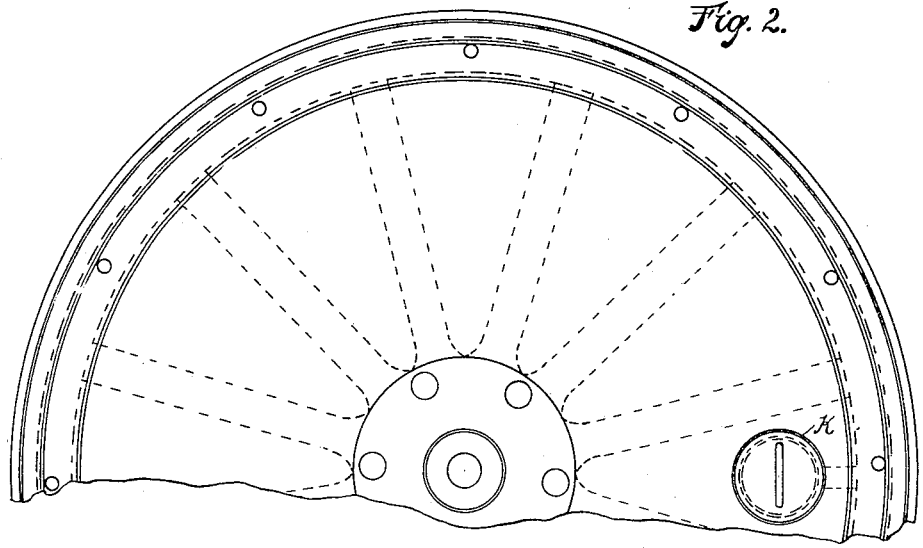
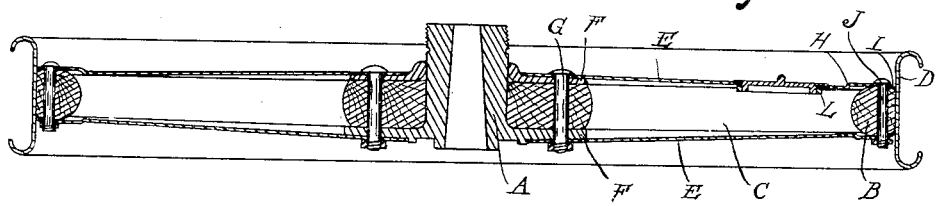
Inventor
Alden L. Putnam
By Whittemore Hulbert + Whittemore
Attorneys

UNITED STATES PATENT OFFICE.

ALDEN L. PUTNAM, OF DETROIT, MICHIGAN, ASSIGNOR TO DETROIT PRESSED STEEL COMPANY, OF DETROIT, MICHIGAN, A CORPORATION OF MICHIGAN.

REINFORCED AND PROTECTED WOODEN VEHICLE-WHEEL.

1,245,269.   Specification of Letters Patent.   Patented Nov. 6, 1917.

Application filed August 21, 1916. Serial No. 116,054.

*To all whom it may concern:*

Be it known that I, ALDEN L. PUTNAM, a citizen of the United States of America, residing at Detroit, in the county of Wayne and State of Michigan, have invented certain new and useful Improvements in Reinforced and Protected Wooden Vehicle-Wheels, of which the following is a specification, reference being had therein to the accompanying drawings.

The invention relates to vehicle wheels of the type used upon motor vehicles and comprising wooden felly and spokes, with a metallic hub and rim. It is the object of the invention, first, to strengthen and reinforce the wheel; and second, to protect it so as to prevent accumulation of mud or dust upon the spokes and to simplify the process of cleaning. To this end the invention comprises the novel construction as hereinafter set forth.

In the drawings:

Figure 1 is a cross section through the wheel;

Fig. 2 is a side elevation thereof; and

Fig. 3 is a view similar to Fig. 1 showing a modified construction.

A is the hub, B the felly, C the spokes and D the metallic rim of a vehicle wheel of ordinary construction. In the use of such wheels the spaces between the spokes around the felly accumulate dust or mud and are difficult to clean; also water, working into the joints, is injurious to the structure. On the other hand, a wooden spokes wheel is a comparatively weak structure, especially when subjected to lateral shocks or stresses. I have therefore provided means for strengthening and protecting the wheel, comprising metallic disks clamped upon opposite sides of the hub and extending to the periphery of the felly, the joint at the periphery being dust-proof and substantially water-tight. In detail, E and E' are metallic disks, which as shown in Fig. 1 are secured to the hub outside of the metallic flange plates F and F' and by means of the hub bolts G. The disks are apertured to fit around the body of the hub and are slightly dished so that the space between them at the felly is less than at the hub. There is also preferably formed adjacent to the felly an annular shoulder H, and at the periphery there is an inturned flange I. which fits between the wooden felly and the metallic rim so as to form a tight joint. A series of bolts J passing through the felly are used to tightly clamp the bolts thereto.

Where the wheels are provided with pneumatic tires, the tire filler tube is usually arranged in one of the spaces between spokes, and therefore the placing of imperforate disks on opposite sides of the spokes would prevent access to this tube. I have avoided this objection by providing a removable cap K for covering an aperture in the side of one of the disks located opposite the filler tube. The cap is preferably screw-threaded and engages a correspondingly threaded bearing L surrounding the aperture and which may be formed of a member welded or otherwise secured to the disk.

With the construction shown in Fig. 3, instead of placing the disks outside of the metallic flanges of the hub they are placed between said flanges and the wooden spokes, and clamped by the hub bolts G. With this construction an annular shoulder M is formed in the disk at the periphery of the hub flanges, to enlarge the width between disks at the hub and thereby to strengthen and stiffen the disks.

What I claim as my invention is:

1. The combination with a wheel having wooden felly and spokes and a metallic hub, of a reinforcement and protection for said wheel, comprising a pair of disks arranged upon opposite sides of the wheel and secured thereto by the hub bolts, the peripheral portions of said disks bearing upon said felly and forming a tight joint therewith.

2. The combination with a wheel having wooden felly and spokes and a metallic hub, said spokes having substantially equal width from end to end, of a reinforcement and protection for said wheel, comprising a pair of disks centrally clamped upon opposite sides of the wheel by the hub bolts, said disks being slightly dished to produce a tapering cross-section from hub to felly, and additional clamping means for said disks at the felly.

3. The combination with a wheel having wooden felly and spokes and a metallic hub and rim, of a reinforcement and protection for said wheel, comprising a pair of metallic disks clamped upon opposite sides of said hub by the bolts thereof, said disks extending to the periphery of the felly and having inturned edges for engaging the joint between said felly and rim.

4. The combination with a vehicle wheel having wooden felly and spokes and a metallic hub and rim, of a reinforcement and protection for said wheel, comprising a pair of disks secured on opposite sides of the hub by the bolts thereof and having inturned peripheral edges engaging the joint between the felly and rim, and clamping bolts passing through said felly and securing said disks thereto.

5. The combination with a spoked vehicle wheel, of a tire filler tube arranged in one of the spaces between the spokes, reinforcing and protecting plates arranged respectively upon opposite sides of said wheel inclosing said spaces between the spokes, one of said plates being orificed to give access to said tire filler tube, a screw-threaded cap for closing said orifice, and a threaded bearing for said cap peripheral to said orifice.

6. The combination with a vehicle wheel having wooden felly and spokes and a metallic hub and rim, said hub being provided with outwardly-extending flanges on opposite sides thereof for embracing the spokes, of a reinforcement and protection for said wheel, comprising a pair of disks extending from the hub to the rim, the inner portions of said disks being clamped between the hub flanges and the spokes, and the peripheral portions of said disks being clamped to the felly.

In testimony whereof I affix my signature.

ALDEN L. PUTNAM.

Copies of this patent may be obtained for five cents each, by addressing the "Commissioner of Patents, Washington, D. C."